(12) United States Patent
Ancora et al.

(10) Patent No.: US 8,194,726 B2
(45) Date of Patent: Jun. 5, 2012

(54) FILTER WEIGHT ESTIMATION DEVICE WITH UPDATE AT HSDSCH SYMBOL RATE, FOR A SYMBOL LEVEL EQUALISER

(75) Inventors: Andrea Ancora, Nice (FR); Ahmet Bastug, Sophia-Antipolis-Valbonne (FR)

(73) Assignee: ST-Ericsson SA, Geneva (CH)

( * ) Notice: Subject to any disclaimer, the term of this patent is extended or adjusted under 35 U.S.C. 154(b) by 931 days.

(21) Appl. No.: 12/278,643

(22) PCT Filed: Feb. 6, 2007

(86) PCT No.: PCT/IB2007/050396
§ 371 (c)(1),
(2), (4) Date: Aug. 7, 2008

(87) PCT Pub. No.: WO2007/093934
PCT Pub. Date: Aug. 23, 2007

(65) Prior Publication Data
US 2009/0034602 A1    Feb. 5, 2009

(30) Foreign Application Priority Data
Feb. 13, 2006   (EP) .................................... 06300128

(51) Int. Cl.
*H03H 7/40* (2006.01)
(52) U.S. Cl. ........................................ 375/232; 375/229
(58) Field of Classification Search .................. 375/229, 375/230, 231, 232, 234, 236, E1.025, 148; 708/322, 323
See application file for complete search history.

(56) References Cited

U.S. PATENT DOCUMENTS

| 6,175,588 | B1 * | 1/2001 | Visotsky et al. | 375/148 |
| 2002/0057730 | A1 * | 5/2002 | Karlsson et al. | 375/152 |
| 2002/0136158 | A1 * | 9/2002 | Frank | 370/209 |
| 2003/0095529 | A1 * | 5/2003 | Petre et al. | 370/342 |
| 2006/0098726 | A1 * | 5/2006 | Pan et al. | 375/229 |

(Continued)

OTHER PUBLICATIONS

Ahmet Bastug and Dirk T.M. Slock, "Downlink WCDMA Receivers Based on Combined Chip and Symbol Level Equalization", Philips Semiconductors and Eurecom Institute, 2005.*

(Continued)

*Primary Examiner* — Aristocratis Fotakis
(74) *Attorney, Agent, or Firm* — William J. Kubida; Hogan Lovells US LLP

(57) ABSTRACT

A filter weight estimation device (D), for an equaliser of a communication receiver, comprises i) a tap delay line connected to N branches each comprising a descrambler (DS1-DSN) and a despreader (DE1-DEN), for despreading received signals, corresponding to one or more available multiplexed channels associated with different channelization codes, with a reference code equal to the sum of all the channelization codes associated to the available multiplexed channels, Ë) an adaptive filter (AF) comprising N input filter taps respectively connected to the N branches and a regression input and arranged to estimate the sum of the symbols outputted by the despreaders (DE1-DEN) and associated to each available channel, said symbol sum constituting a pseudo-symbol estimate defining a reference symbol estimate (rs), and to implement a mechanism of a LMS type to deliver a chosen number of filter weights (fi), iË) a quantiser (SM) arranged to quantise the reference symbol estimate (rs) to estimate a desired reference symbol (d), and iv) an error computation module (AM) for subtracting the reference symbol estimate (rs) from the desired reference symbol (d) to output an error signal (e) feeding the regression input.

8 Claims, 3 Drawing Sheets

U.S. PATENT DOCUMENTS

2006/0171451 A1* 8/2006 Pietraski et al. .............. 375/232

OTHER PUBLICATIONS

Ahmet Bastug, "Advanced Receivers for High Speed Downlink Packet Access in UMTS", Thesis, Ecole Nationale Superieure des Telecommunications, Paris, France, May 2006.*

Colin D. Frank, Eugene Visotsky and Upamanyu Madhow, "Adaptive Interference Suppression for the Downlink of a Direct Sequence CDMA System with Long Spreading Sequences", Motorola and University of California, 2002.*

Ahmet Bastug, Andrea Ancora and Dirk T.M Slock, "Adaptive Equalization at HSDPA Symbol Level", Eurecom and ST-NXP Wireless, 2nd International Workshop on Multiple Access Communications (MACOM'09), Jun. 2009, IEEE.*

Adam R. Margetts and Philip Schniter, "Adaptive chip-rate equalization of downlink multirate wideband CDMA ", Ohio State University, Jun. 2005, IEEE.*

* cited by examiner

FILTER WEIGHT ESTIMATION DEVICE WITH UPDATE AT HSDSCH SYMBOL RATE, FOR A SYMBOL LEVEL EQUALISER

FIELD OF THE INVENTION

The present invention relates to downlink transmissions in wireless CDMA networks implementing HSDPA (High Speed Downlink Packet Access—release 5 of UMTS standard—specification HSDPA 3G TR 25.212 of the 3GPP), or the like, for very high data rates.

It is recalled that a downlink transmission relates to a transmission from a mobile network (for instance a base station such as a Node B) towards a user mobile station (or user equipment), while an uplink transmission relates to a transmission from a user mobile station towards a mobile network.

BACKGROUND OF THE INVENTION

As it is known by a person skilled in the art, in UMTS FDD system ("Frequency Division Duplex") (and other similar and equivalent systems) downlink signals intended for user mobile stations are processed before being transmitted in a multiplexed manner. This process consists in independently spreading the different user symbols (associated to different HSDSCH channels) at possibly different rates with their respective orthogonal short (channelization or spreading) codes, then adding the resultant streams at chip level and finally scrambling the sum chip sequence by a cell-specific long (scrambling) code prior to synchronous transmission. For instance, in DS-CDMA systems where multi-rate is considered for providing various levels of Quality of Service (QoS), one uses Orthogonal Variable Spreading Factor (OVSF) codes with factors ranging from 4 to 512 in powers of 2 as orthogonal short spreading codes for spreading the user symbols.

It is recalled that in the UMTS standard four QoS classes are defined with differing delay and ordering needs: conversational (low delay and strict ordering—for instance voice data), streaming (modest delay and strict ordering for instance video data, interactive (modest delay and modest ordering—for instance web browsing data) and background (no delay guarantee and no ordering—for instance bulk data transfer).

HSDPA has been proposed to increase the downlink data throughput by using fast physical layer retransmission and transmission combining and link adaptation controlled by each base station (Node B).

In HSDPA two of the main features of W-CDMA (wireless-CDMA) are disabled: the variable spreading factor and the fast power control. They are replaced by adaptive coding rate, adaptive modulation and extensive multi-code operations. The spreading factor is fixed to 16, and a user mobile station can use up to 15 (channelization or spreading) codes simultaneously, which enables a large dynamic range of HSDPA link adaptation and maintains a good spectral efficiency. The scheduling process is done in the Node Bs so that they had the possibility to allocate all the capacity to one user, if necessary and if the channel conditions make this strategy efficient.

HSDPA offers four main properties: allocation of multiple access codes for HSDPA service, fast scheduling of allocated codes, link adaptation and hybrid automatic repeat request (HARQ). To support these properties, two additional types of channels have been introduced. In the downlink, one or more high-speed shared control channels (HS-SCCHs) broadcast HSDPA channel assigned identities, transport format and HARQ process identifier. In the uplink, the high-speed dedicated physical control channel (HS-DPCCH) carries the status reports for HARQ and the channel quality indicators (CQIs).

In CDMA downlink transmission, although the transmitted user signals at the base station side are orthogonal, they are no more orthogonal at the mobile station front-end due to the multipath effect of the propagation channel between the transmitter and the receiver. This loss of orthogonality consequently causes inter-code interference (also known as multi-user interference (MUI) or multi-access interference (MAI)), inter-chip interference and inter-symbol interference in the symbol estimates performed by the communication receivers of the user mobile stations. Communication receivers that are within an optimal or close-to-optimal category, i.e. multi-user detectors (MUDs) and interference cancellers (ICs), most of the time require the knowledge about the signal and the channel parameters of all active users so as to mitigate the multipath effect and to detect the desired data stream in the most reliable way.

However the possibility to implement MUDs or ICs in mobile stations is limited due to their high complexity and due to the fact that the transmission parameters of all the users are usually unknown. A very practical and highly utilised suboptimal solution consists in using a conventional Rake Receiver that performs a matched filter operation on the code of the desired user, in which the multi-user interference is considered as an additional white noise. However, when a small number of spreading codes is used to achieve high data rates (as it is the case in HSDPA), the performance of the Rake receiver decreases due to the fact that the multipath interference becomes significant and the correlation characteristics of the spreading sequences are destroyed.

For this reason it has been proposed to use an equaliser in a HSDPA communication receiver in order to restore the orthogonality between the user codes and to limit the interference, and therefore achieving very high data rates.

It is recalled that an equaliser is a linear filter used for equalizing a channel, which is common for the signals (symbols) of all the users located in a same cell, with a delay of a chosen number of chips, in order to maximise the signal to interference plus noise ratio (SINR). This linear filter is generally of the LMMSE type. It comprises first and second stages. The first stage is provided for determining the filter weights of the linear filter, while the second stage is provided for data filtering by means of the filter weights.

Several types of equaliser for HSDPA have been proposed. They provide remarkable gains in performance. In particular they propose the usage of adaptive algorithms which approximate the chip level linear minimum mean-squared error (LMMSE) receiver expression derived in the following two articles:

M. Lenardi, D. T. M. Slock "SINR maximizing equaliser receiver for DS-CDMA", EUSIPCO 2000, 10th European association for signal processing conference, 4-9 Sep. 2000—Tampere—Finland, M. Lenardi, D. T. M. Slock "A RAKE structured SINR maximizing mobile receiver for the WCDMA downlink", Asilomar 2001, 35th IEEE Annual Asilomar Conference on Signals, Systems and Computers, 4-7 Nov. 2001—Pacific Grove, USA.

In general the adaptive equalisers are either symbol level solutions updated at the primary common pilot channel (PCPICH) symbol rate or chip level solutions updated at chip rate (i.e. the filter adaptation operation at chip rate and chip level).

Pilot-aided equaliser design for CDMA systems is not as trivial as it is for TDMA systems like GSM. In TDMA systems the common pilot signal is time-multiplexed with the payload data. Therefore it is not interfered by any user data but only by additive white Gaussian noise (AWGN). In CDMA systems such as the UMTS FDD downlink, the pilot data (PCPICH) is code-multiplexed with all the other existing users and control channels. Therefore, since PCPICH chip power is only 10% of the base station transmitted chip power, a high level of interference impacts it and it cannot be used efficiently for training equaliser weights at chip rate.

Instead, in the article:

of C. D. Frank, E. Visotsky and U. Madhow "Adaptive Interference Suppression for the Downlink of a Direct Sequence CDMA System with Long Spreading Sequences", Journal of VLSI Signal Processing, vol. 30, no. 1, pp. 273-291, March 2002, one despreads the received signal with the pilot channelization code, and then suppresses most of the interference over the PCPICH signal.

In this method, in order to determine the N filter weights, the first stage comprises a tap delay line connected to N branches each comprising a descrambler and a despreader (for despreading the received signals with a PCPICH channelization code $C_{ch,256,0}$ (i.e. the pilot signal)), a linear filter comprising N input filter taps respectively connected to the N branches and a regression input and arranged to output a PCPICH symbol estimate, and an adaptation module for subtracting the PCPICH symbol estimate from a desired symbol (i.e. the correct (and known) PCPICH symbol) to output an error signal feeding the regression input. Although this is a quite effective method against interference, due to the long despreading operation, adaptation is considered only once every 256 chips, which correspond to one PCPICH period. This drives the technique to be slow in tracking the time-varying channels.

It is recalled that in HSDPA the downlink received signals correspond generally to multiplexed HSDSCH channels ("High-Speed Downlink Shared Channels") associated with different 16 chips long channelization codes. However none of the state of the art equalisers has been designed in order to exploit the characteristics, properties and features of HSDPA. So, they are not really optimised for HSDPA.

SUMMARY OF THE INVENTION

So, the object of this invention is to provide a filter weight estimation device for a symbol level adaptive equaliser for filtering operation at chip rate and chip level, which, contrary to the prior art, updates at HSDSCH symbol rate, which is a 16 times higher rate and which is fully suitable to the HSDPA characteristics, properties and features.

For this purpose, it provides a filter weight estimation device, for a (symbol level) equaliser of a communication receiver (of a HSDPA type or the like), comprising:

a tap delay line to delay received signals,

N branches each connected to said tap delay line and comprising a descrambler and a despreader, for despreading the received delayed signals (corresponding to one or more available multiplexed channels associated with different channelization codes) with a reference code in order to output a symbol (at N chip spaced delayed instants which will be combined by the weights of the following adaptive filter), an adaptive filter comprising N input filter taps respectively connected to the N branches and a regression input (containing the N despreader output symbols) and arranged to output a reference symbol estimate, an error computation module for subtracting the reference symbol estimate from a desired reference symbol to output an error signal feeding the regression input.

This filter weight estimation device is characterised in that:

each of its despreaders is arranged to despread the delayed received signals with a reference code equal to the sum of all the channelization codes associated to the available multiplexed channels, its adaptive filter is arranged to estimate the sum of the symbols output by the despreaders and associated to each available channel, this symbol sum constituting a pseudo-symbol estimate defining the reference symbol estimate, and arranged to implement a mechanism of a (N)LMS type to deliver a chosen number of filter weights, and it further comprises a (multilevel) quantiser (detector or slicer) arranged to quantise the reference symbol estimate in order to estimate the desired reference symbol.

This filter weight estimation device may be arranged to process received signals corresponding to available multiplexed channels of the HSDSCH type and each associated to a 16 chips long channelization code.

Moreover, the adaptive filter may be of the least mean square (LMS) type or the normalised least mean square (NLMS) type, in order to realise a linear minimum mean-squared error (LMMSE) filter.

Moreover, the quantiser may be arranged to make maximum a posteriori decision on the adaptive filter output (pseudo-symbol estimate), based on a priori probabilities, in order to estimate the reference symbol estimate which is used to train the adaptive filter.

The invention also provides a symbol level equaliser comprising a filter weight estimation device such as the one above introduced and a data filtering stage comprising a linear filter which is provided with filter weights by the filter weight estimation device, is fed with the received signals, and is arranged to equalise these received signals with a delay equal to a chosen number of chips in order to output a total chip sequence estimate.

Moreover, the data filtering stage may comprise i) the linear filter which is fed with the received signals and outputs the total chip sequence estimate, ii) a descrambler provided for descrambling the total chip sequence estimate with a chosen scrambling code in order to output a descrambled total chip sequence estimate, and iii) at least one despreader arranged for despreading the descrambled total chip sequence estimate with a channelization code associated to a user channel in order to output user symbols.

The invention also provides a communication receiver (of a HSDPA type or the like) comprising an equaliser such as the one above introduced.

The invention also provides a communication equipment comprising a communication receiver such as the one above introduced. Such a communication equipment may be a mobile telephone, for instance.

BRIEF DESCRIPTION OF THE DRAWINGS

Other features and advantages of the invention will become apparent on examining the detailed specifications hereafter and the appended drawings, wherein.

The appended drawings may not only serve to complete the invention, but also to contribute to its definition, when needed.

DESCRIPTION OF THE PREFERRED EMBODIMENTS

Figure 1:
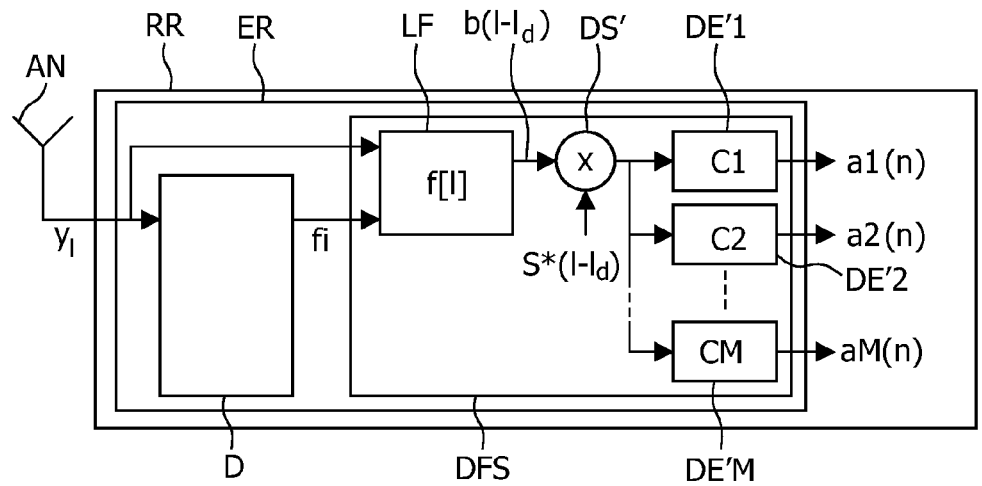
FIG. 1 schematically illustrates an example of communication receiver comprising a symbol level adaptive equaliser according to the invention, FIG. 2 schematically illustrates an example of embodiment of a filter weight estimation device according to the invention, for a symbol level equaliser.
Figure 2:
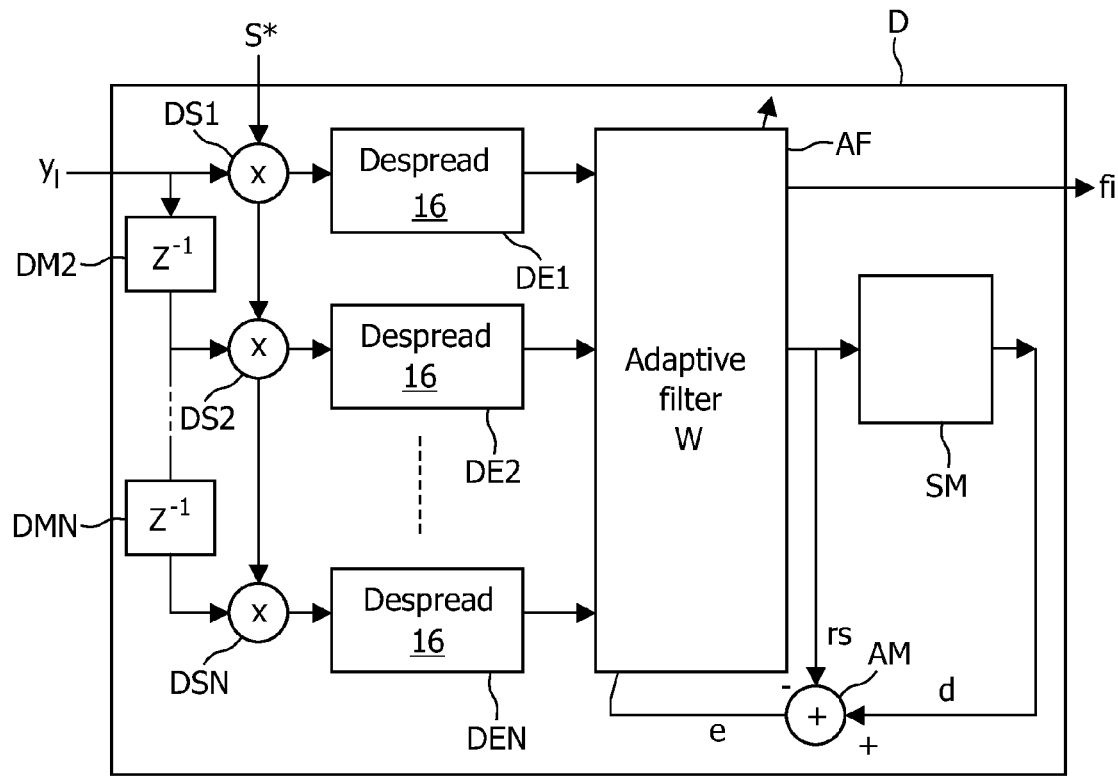

Reference is initially made to FIGS. 1 and 2 to describe a communication receiver RR comprising an example of filter weight estimation device D according to the invention.

In the following description it will be considered that the communication receiver RR is intended for a communication equipment such as a mobile telephone adapted to radio communication in an UMTS FDD network implementing HSDPA (High Speed Downlink Packet Access—release 5 of UMTS standard—specification HSDPA 3G TR 25.212 of the 3GPP). But it is important to notice that the invention is neither limited to this type of communication equipment nor to this type of communication network. Indeed, it applies to any wireless CDMA networks which assign multiple codes to a user.

The mobile telephone is arranged to transmit (uplink) and receive (downlink) data packets to and from a base station (Node B) of the UMTS network. The invention only concerns the processing of signals transmitted through high speed downlink shared channels. However it is also applicable to any orthogonal CDMA system, which assigns multiple codes to a user.

As schematically illustrated in FIG. 1, a HSDPA communication receiver RR according to the invention comprises notably an antenna AN, for receiving downlink signals transmitted by a base station, such as a Node B in case of a UMTS network, and a symbol level equaliser ER arranged to transform said received signals into user symbols.

It is recalled that in UMTS FDD downlink a transmitted downlink signal results from a processing by a base station of groups of symbols respectively intended for different users. This process is briefly described hereafter.

First, the different groups of user symbols are independently spread at possibly different rates with their respective orthogonal short (channelization or spreading) codes.

When these codes are HSDPA codes, they may be of the OVSF ("Orthogonal Variable Spreading Factor") type, for instance. Other codes might have lengths ranging from 4 to 512.

Figure 3:
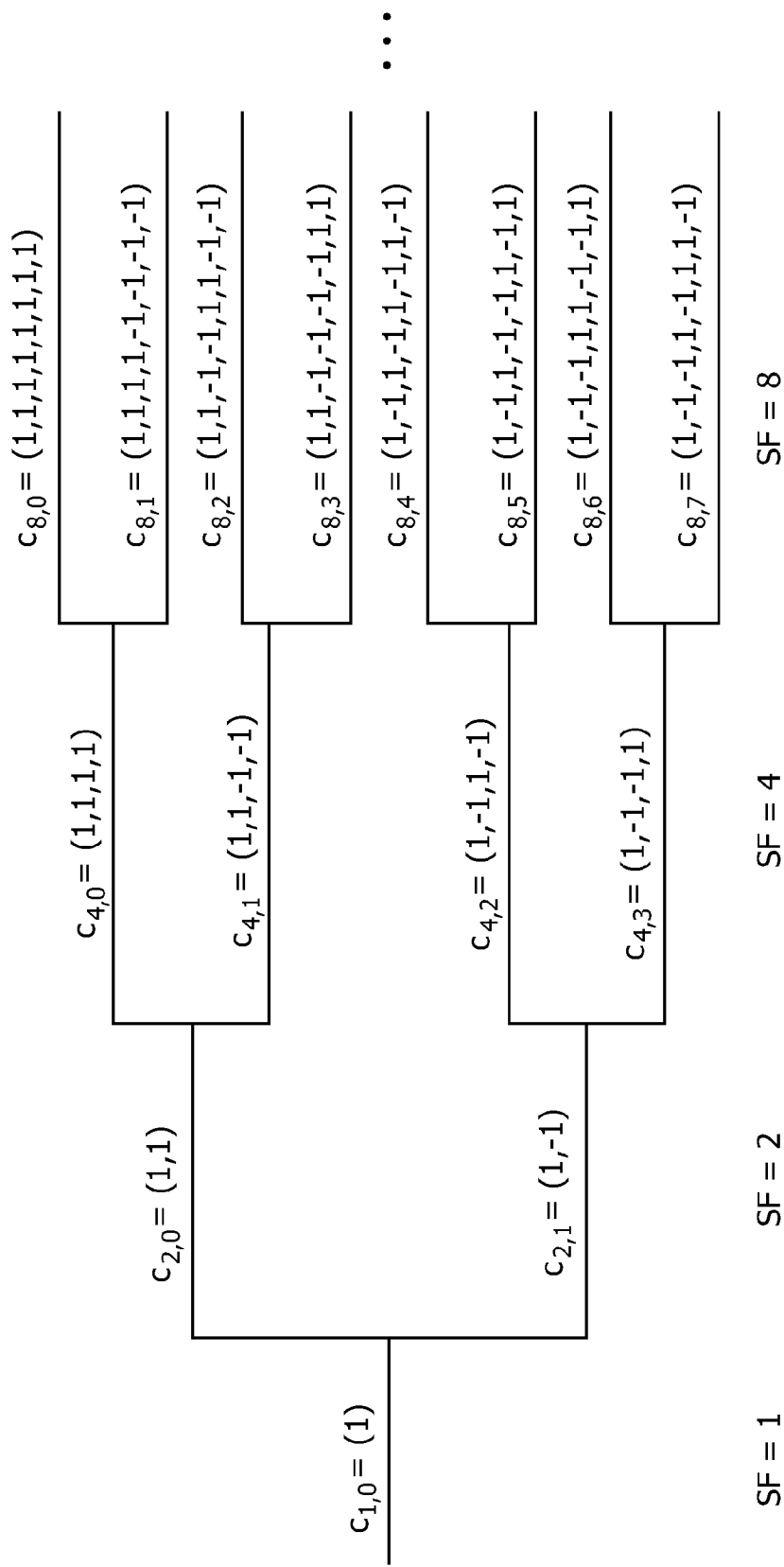
FIG. 3 is a partial example of an OVSF code tree used in an UMTS FDD downlink, FIG. 4 schematically illustrates an example of the possible values of the real or the imaginary part of the desired reference symbol (d) resulting from the sum of the QPSK symbols at the output of the adaptive filter (AF) as a consequence of the despreading operation with the sum of five HSDPA channelization codes, and FIG. 5 schematically illustrates an example of MAP decision boundaries for real and imaginary parts of a pseudo-symbol constellation; the thin vertical lines denote the midpoints while the thick vertical lines denote the boundaries.

A partial example of OVSF code tree is illustrated in FIG. 3. In this example reference SF designate the spreading factor. The spreading factors of different users may be identical or different. It is recalled that when two users A and B are respectively associated to spreading factors (SF) equal to 16 and 128, then one (1) symbol of user A needs 16 chips while one (1) symbol of user B needs 128 chips. Therefore during 128 chips, the user B can only send one symbol while the user A can send 8 symbols (higher transmission rate).

When the spreading is finished the different groups of spread symbols are added (i.e. multiplexed) and the resultant, which constitutes a sum chip sequence, streams at chip level. Then the sum chip sequence is scrambled by a long scrambling code, which is specific to the cell in which the users (addressees of the signals to transmit) are located. Finally the signal resulting from the scrambling is synchronously transmitted by the base station to the user equipments.

When a user equipment receives such signals, its communication receiver RR transmit them to its equaliser ER.

As illustrated in FIG. 1, an equaliser ER according to the invention comprises first D and second DFS stages. The first stage is a filter weight estimation device D, which contains a symbol level adaptive filter AF, implementing a mechanism (or algorithm) such as the least mean square (LMS) algorithm or its normalised form NLMS, and is dedicated to computation (or estimation) of filter weights fi (i=1 to N) intended for the second stage DFS. The second stage DFS is a data filtering stage, which will be described later.

As illustrated in FIG. 2, a filter weight estimation device D, according to the invention, comprises a tap delay line (DMi, with i=2 to N; DM2-DMN), N branches (DEi and DSi, with i=1 to N), an adaptive filter AF, a multilevel quantiser SM (for instance a slicer or a detector), and an error computation module AM.

The tap delay line receives the signals $y_i$ to process and comprises N−1 sub-modules DM2-DMN intended for introducing different chosen delays to the received signals before they reach the N branches. The first (upper) branch is fed with non delayed signals.

The number N of branches is equal to the number of input filter taps of the adaptive filter AF. Each branch comprises a descrambler DSi and a despreader DEi.

Each descrambler DSi is arranged to descramble the signals it receives from the tap delay line with the long scrambling code S* that has been previously used into the base station and is specific to the cell in which their user equipment is located. So, each descrambler DSi outputs descrambled signals.

Each despreader DEi is arranged to despread the descrambled signals it receives from the descrambler DSi to which it is connected to. This despreading is carried out with a reference code which is equal to the vector sum of all the short channelization (or spreading) codes (1 up to 15 elements) that have been used into the base station to spread the different groups of user symbols associated to different HSD-SCH channels. So the result of the sum depends on the number of available HSDSCH channels that have been multiplexed into the base station, and of course of the respective values of the channelization codes used for spreading the groups of user symbols of these available HSDSCH channels.

Each despreader DEi outputs a symbol, which feeds the corresponding input filter tap of the adaptive filter AF. Each outputted symbol is representative of a sum since the despreading code that has been used to get it is the sum of all the short channelization codes that have been used.

The adaptive filter AF comprises N input filter taps respectively connected to the N branches (and more precisely to the output of the despreaders DEi) and a regression input fed with an error signal e outputted by the error computation module AM.

The input filter taps of the adaptive filter AF receiving respectively the symbols outputted by the despreaders DEi, and each representative of a sum, it therefore outputs an estimate of the sum of all the symbols. This sum estimate is named pseudo-symbol estimate and defines a reference symbol estimate rs.

As mentioned before the adaptive filter AF implements an algorithm of the (N)LMS type to determine the filter weights fi by means of the error signal e received onto its regression input. It is recalled that the LMS algorithm works as follows:

$$w_{l+1} = w_l + \mu u_l^H (d[l] - u_l w_l) = w_l + \mu u_l^H e[l],$$

where:
- $w_1$ is a NX1 adaptive filter weight vector at HSDPA symbol instant 1,
- $u_1$ is a 1×N adaptive filter input regression vector at HSDPA symbol instant 1 (this vector corresponds to the N despreader outputs),
- and the reference symbol estimate rs (adaptive filter output) is given by $rs = u_l w_l$.

The multilevel quantiser SM receives the reference symbol estimate rs from the adaptive filter AF. It is arranged to carry out a maximum a posteriori (MAP) decision (or multilevel quantization) on the reference symbol estimate rs in order to output a desired reference symbol d. This MAP decision is well known by the person skilled in the art and is briefly presented below.

Figure 4:
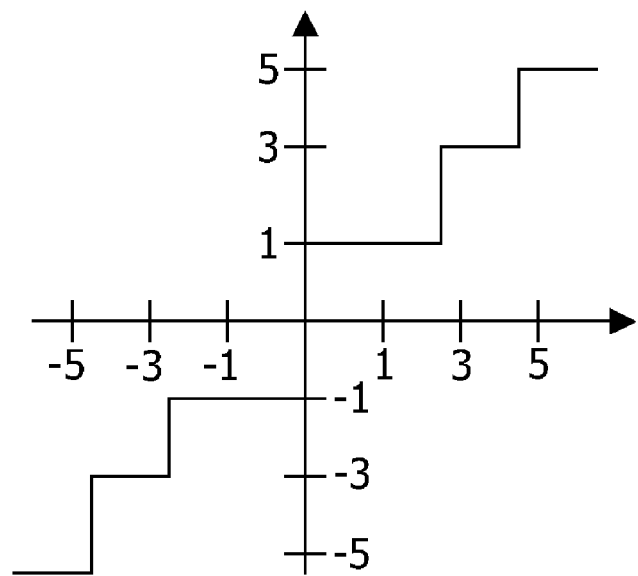

A schematic example of the desired reference symbol d outputted by the quantiser SM is illustrated in FIG. 4. In this example, the values −5, −3, −1, 1, 3, 5 in both directions represent the different values of the real and imaginary parts of the sum of five symbols, taking into account the fact that the values of the real and imaginary parts of one symbol can be equal to +1 or −1 in case where the modulation is QPSK. This set of values (−5, −3, −1, 1, 3, 5) is named a constellation of points by the man skilled in the art.

The points of such a constellation have different (a priori) probabilities, which can be used by the quantiser SM during the desired reference symbol estimation.

If one considers the example of point constellation mentioned above, it is possible to write $2^5 = 32$ binary sequences with 5 symbols. Now, if one sums up the symbols of each configuration one ends up 1, 5, 10, 10, 5, 1 times respectively with values −5, −3, −1, 1, 3, 5. One can deduce from this that value 3 is 5 times more probable than value 5 (5/32 versus 1/32), or value −1 is 2 times more probable than value −3 (10/32 versus 5/32), for instance.

Figure 5:
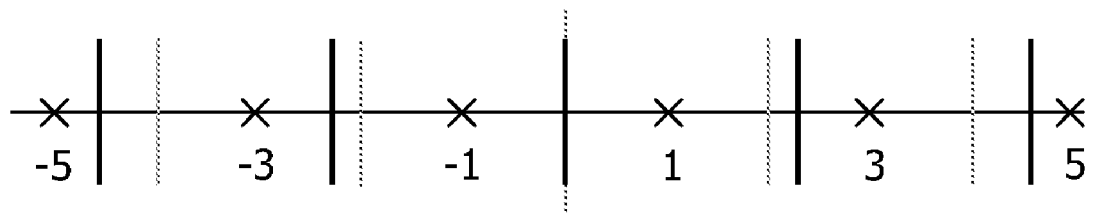

So if the adaptive filter AF outputs a value rs equal to 4, which is between the two points 3 and 5 of the set (−5, −3, −1, 1, 3, 5), respectively associated to a priori probabilities 5/32 and 1/32, then if one exploit these a priori probabilities one gives much more chance to a value equal to 3 than a value equal to 5. So the MAP decision boundary between values 3 and 5 should be closer to 5 than 3, as illustrated in FIG. 5. In the example illustrated in FIG. 5, the thin vertical lines denote the midpoints while the thick vertical lines denote the boundaries.

The quantiser SM can use this kind of MAP decision boundaries, based on a priori probabilities, to estimate the symbol values.

The error computation module AM receives the reference symbol estimate rs from the adaptive filter AF and the desired reference symbol d from the quantiser SM and is arranged to subtract the reference symbol estimate rs from the desired reference symbol d to output the error signal e (e=d−rs) which feeds the regression input of the adaptive filter AF.

As mentioned above, the data filtering stage DFS intervenes when the adaptive filter AF has determined (or estimated) N filter weights. It is arranged to equalise the signals $y_l$ received by its HSDPA communication receiver RR before descrambling and despreading them.

For this purpose and as illustrated in FIG. 1, the data filtering stage DFS preferably comprises a linear filter LF, a descrambler DS', and at least one despreader DE'j (j=1 to M).

The linear filter LF is arranged to equalise the signals $y_l$ received by its level symbol equaliser ER with a delay $l_d$ equal to a chosen number of chips in order to increase the signal to noise ratio (SNR). For this purpose, it comprises N weighted filter modules which respectively use the N weight filters fi determined by the filter weight estimation device D and jointly output a total chip sequence estimate $b(l-l_d)$ representative of a received signal. This linear filter is a well-known chip rate FIR filter which uses the filter weights fi obtained by the adaptive filter AF when it filters the received chip sequence.

The descrambler DS' is fed with each total chip sequence estimate $b(l-l_d)$ outputted by the linear filter LF. It is arranged to descramble each total chip sequence estimate $b(l-l_d)$ with the long scrambling code $S^*(l-l_d)$ that has been previously used into the base station and is specific to the cell in which its user equipment is located. So, it outputs a descrambled total chip sequence estimate.

In case where the user equipment is a mobile telephone, the data filtering stage DFS only comprises one despreader DE'1. A user equipment needs several parallel despreaders DE'j (j=1 to M) when it has to determine symbols for several (M) codes assigned to it. So each despreader DE'j is associated to a user HSDSCH channel and therefore uses the channelization code which corresponds to this user HSDSCH channel (and previously used into the base station to spread its user symbols) to despread the descrambled total chip sequence estimate it receives in order to output user symbols aj(n).

Another architecture of data filtering stage DFS, similar to the one of the filter weight estimation device may be envisaged. In this other architecture the received signal is first descrambled, then despread, and finally equalised by a linear filter. However the architecture illustrated in FIG. 1 is preferable when the equaliser ER must detect more than one group of symbols spread with different channelization codes, because it allows to share the same linear filter for all the channelization codes.

The symbol level equaliser ER may be an integrated circuit realised in CMOS technology or in any technology used in chip industry fabrication or in programmable processor, vector processor or DSP devices.

The invention offers several advantages, and notably:
- since one uses all the HSDPA channelization codes, the desired response energy is much higher for adapting the equaliser, because the pseudo-symbol at the adaptive filter output is correlated with more signal component in the received signal,
- since one uses a short channelization (or spreading) code (16 chips long) as reference code into the despreaders, the adaptive filter can be adapted every 16 chips while in a state of the art equaliser it is adapted every 256 chips because the pilot reference code is 256 chips long,
- since there is expanded sets of values (or points) in the constellations, one can use a MAP estimator to better detect the estimated pseudo-symbol which defines the reference symbol estimate. Indeed it is possible to use a priori probabilities of different constellation points,
- the error on a symbol estimate is notably reduced. Indeed, in a QPSK constellation if an error is done in one dimension (real or imaginary) with one HSDPA symbol, for instance one detects a symbol value equal to 1−j instead of a correct symbol value equal to 1+j, then the gradient vector in the LMS adaptation goes in a 90° wrong direction, while with an expanded constellation based, for example, on 5 channelization codes, if one detects a symbol value equal to 3+5j instead of a correct symbol value equal to 5+5j, the gradient vector goes in a 14° wrong direction.

The invention is not limited to the embodiments of filter weight estimation device, symbol level equaliser, HSDPA communication receiver, and communication equipment described above, only as examples, but it encompasses all alternative embodiments which may be considered by one skilled in the art within the scope of the claims hereafter.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

The invention claimed is:

1. A filter weight estimation device for an equalizer of a communication receiver, comprising:
   a tap delay line connected to N branches each comprising a descrambler and a despreader, for despreading received signals, corresponding to at least one available multiplexed channel associated with a channelization code, with a reference code to output a symbol, where N is an integer;
   an adaptive filter comprising N input filter taps respectively connected to said N branches and a regression input and arranged to output a reference symbol estimate; and
   an error computation module for subtracting said reference symbol estimate from a desired reference symbol to output an error signal that is fed to said regression input,
   wherein each despreader is arranged to despread the received signals with said reference code equal to a vector sum of all the channelization codes that have been used into a base station to spread different groups of user symbols associated to the different multiplexed channels,
   wherein said adaptive filter is arranged to estimate a symbol sum by said despreaders and associated to each available multiplexed channel, and arranged to implement a mechanism of a least mean square type to deliver a chosen number of filter weights,
   wherein said symbol sum constitutes a pseudo-symbol estimate defining said reference symbol estimate, and
   wherein said adaptive filter further comprises a multilevel quantizer arranged to quantize said reference symbol estimate in order to estimate said desired reference symbol.

2. The filter weight estimation device according to claim 1, wherein said filter weight estimation device is arranged to process said received signals corresponding to the available multiplexed channels of a HSDSCH type and each associated to a 16 chips long channelization code.

3. The filter weight estimation device according to claim 1, wherein said adaptive filter is of a type chosen in a group comprising at least a least mean square type and a normalized least mean square type, in order to realize a linear minimum mean-squared error filter.

4. The filter weight estimation device according to claim 1, wherein said multilevel quantizer is arranged to make maximum a posteriori decision, based on a priori probabilities, in order to estimate said reference symbol estimate.

5. The equalizer of claim 1, wherein said equalizer comprising said filter weight estimation device; and a data filtering stage comprising a linear filter provided with the filter weights by said filter weight estimation device, fed with said received signals and arranged to equalize said received signals with a delay equal to a chosen number of chips in order to output a total chip sequence estimate.

6. The equalizer according to claim 5, wherein said data filtering stage comprises said linear filter fed with said received signals and arranged to output said total chip sequence estimate, a descrambler arranged for descrambling said total chip sequence estimate with a chosen scrambling code to output a descrambled total chip sequence estimate, and at least one despreader arranged for despreading said descrambled total chip sequence estimate with the corresponding channelization code associated to a user channel in order to output user symbols.

7. A communication equipment comprising the communication receiver according to claim 1.

8. The communication equipment according to claim 7, wherein said communication equipment constitutes a mobile telephone.

* * * * *